(12) United States Patent
Huang et al.

(10) Patent No.: US 9,036,079 B2
(45) Date of Patent: May 19, 2015

(54) COMBINATION APPARATUS AND OPERATING METHOD THEREOF

(71) Applicants: Sintai Optical (Shenzhen) Co., Ltd., Shenzhen, Guandong Province (CN); Asia Optical International Ltd., Tortola (GB)

(72) Inventors: Chang-Yi Huang, Shenzhen (CN); Deng-Ke Guo, Shenzhen (CN); Wei-Wei Lei, Shenzhen (CN); Hai-Tao Zhang, Shenzhen (CN); Hsiang-Yin Lin, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/038,808

(22) Filed: Sep. 27, 2013

(65) Prior Publication Data
US 2014/0198228 A1  Jul. 17, 2014

(30) Foreign Application Priority Data

Jan. 17, 2013  (CN) .......................... 2013 1 0017702

(51) Int. Cl.
*H04N 5/225* (2006.01)
*H04N 5/232* (2006.01)

(52) U.S. Cl.
CPC ......... *H04N 5/2252* (2013.01); *H04N 5/23293* (2013.01); *H04N 5/23203* (2013.01); *G03B 2217/00* (2013.01)

(58) Field of Classification Search
CPC .. H04N 5/2251; G03B 17/0208; G03B 29/00; G03B 2217/00; G03B 2217/002
USPC ...................... 348/373, 211.99, 211.1–211.5, 348/211.8–211.11
See application file for complete search history.

(56) References Cited

U.S. PATENT DOCUMENTS

| 2003/0011704 | A1* | 1/2003 | Sawachi ........................ 348/372 |
| 2010/0053164 | A1* | 3/2010 | Imai et al. ..................... 345/427 |
| 2011/0115932 | A1* | 5/2011 | Shin et al. ................... 348/211.4 |

OTHER PUBLICATIONS

SPIGEN Thailand, SPIGEN SGP iPhone 4 / 4S Camera Mount Kuel S22, 2012.*

* cited by examiner

*Primary Examiner* — Nelson D. Hernández Hernández
(74) *Attorney, Agent, or Firm* — McClure, Qualey & Rodack, LLP

(57) ABSTRACT

A combination apparatus and an operating method thereof are provided. The combination apparatus includes a first device, a second device and a connecting mechanism. The first device includes a first display unit and a first image capturing unit, wherein a picture is captured by the first image capture unit and converted into an image signal for the first display unit to display. The second device includes a second display unit with resolution different from that of the first display unit and is capable of wirelessly controlling the first device. The connecting mechanism is configured to detachably fasten the first device and the second device. The operating method of the combination apparatus includes utilizing the first device and/or the second device to capture a picture; and utilizing the first display unit and/or the second display unit to display the picture.

9 Claims, 7 Drawing Sheets

COMBINATION APPARATUS AND OPERATING METHOD THEREOF

BACKGROUND OF THE INVENTION

1. Field of the Invention

The invention relates to a combination apparatus and an operating method thereof.

2. Description of the Related Art

Mobile phones and cameras are common portable articles nowadays. Generally, the camera can provide a preferred photograph quality, and the mobile phone has a high-resolution screen suitable for observation. Therefore, a skill of using a mobile phone to wirelessly control a camera to photograph and using the mobile phone screen to view captured images has been developed. In operation, the capture image files can be transmitted to the mobile phone for editing or immediately transmitted to other people through the mobile phone. However, the user needs to simultaneously operate a mobile phone with one hand and operate a camera with the other hand, which is very inconvenient.

BRIEF SUMMARY OF THE INVENTION

In view of this, the invention provides a combination apparatus and an operating method thereof, in which a connecting mechanism is utilized to connect a first device (e.g., a camera) and a second device (e.g., a mobile phone), so that a user is allowed to conveniently hold the first device and the second device with one hand for different operations.

The combination apparatus in accordance with an exemplary embodiment of the invention includes a first device, a second device and a connecting mechanism. The first device includes a first display unit and a first image capturing unit. A picture captured by the first image capturing unit of the first device is converted into an image signal that is displayed by the first display unit of the first device. The second device includes a second display unit with resolution different from that of the first display unit of the first device and is capable of wirelessly controlling the first device. The connecting mechanism is configured to detachably fasten the first device and the second device.

In another exemplary embodiment of the invention, the connecting mechanism is a receiving cover, a fixation frame, a magnet or a fixation clamp.

In yet another exemplary embodiment of the invention, the connecting mechanism is a receiving cover configured to receive the first device and the second device, and the receiving cover includes a division plate configured to separate the first device from the second device.

In another exemplary embodiment of the invention, the division plate of the receiving cover is provided with an opening which is faced to the first display unit of the first device.

In yet another exemplary embodiment of the invention, the opening of the division plate of the receiving cover has a dimension which is greater than or equal to that of the first display unit of the first device.

In another exemplary embodiment of the invention, the receiving cover further includes a corrugated part configured on a periphery of the second device, and the corrugated part of the receiving cover is flatted to reduce a volume of the receiving cover when the second device is removed and the receiving cover is pressed.

In yet another exemplary embodiment of the invention, the connecting mechanism is a fixation frame including a plurality of fastening parts which are configured to fasten the first device and the second device respectively.

In another exemplary embodiment of the invention, the fastening parts are extended in opposite directions.

In yet another exemplary embodiment of the invention, the first device is a camera, and the second device is a mobile phone.

In another exemplary embodiment of the invention, the resolution of the first display unit of the first device is less than that of the second display unit of the second device.

The operating method of the combination apparatus in accordance with an exemplary embodiment of the invention includes the steps of: fixing a first device and a second device together, wherein the first device comprises a first display unit, the second device comprises a second display unit, and resolution of the first display unit is different from that of the second display unit; wirelessly connecting the first device and the second device so that the second device can wirelessly control operation of the first device; utilizing the first device and/or the second device to capture a picture; and utilizing the first display unit and/or the second display unit to display the picture.

In another exemplary embodiment of the invention, one part of the picture is displayed by the first display unit, and another part of the picture is displayed by the second display unit.

In yet another exemplary embodiment of the invention, the first display unit of the first device is switched off when the second display unit of the second device is switched on to display the picture.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
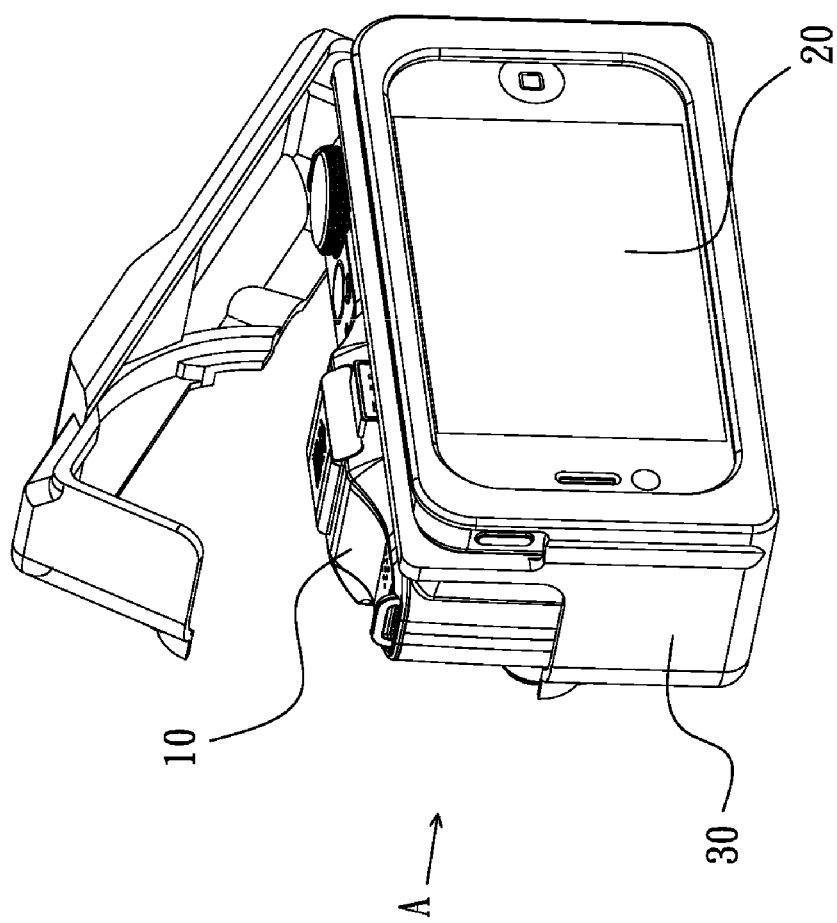
FIG. 1A is a perspective view of a first embodiment of a combination apparatus of the invention.
Figure 1B:
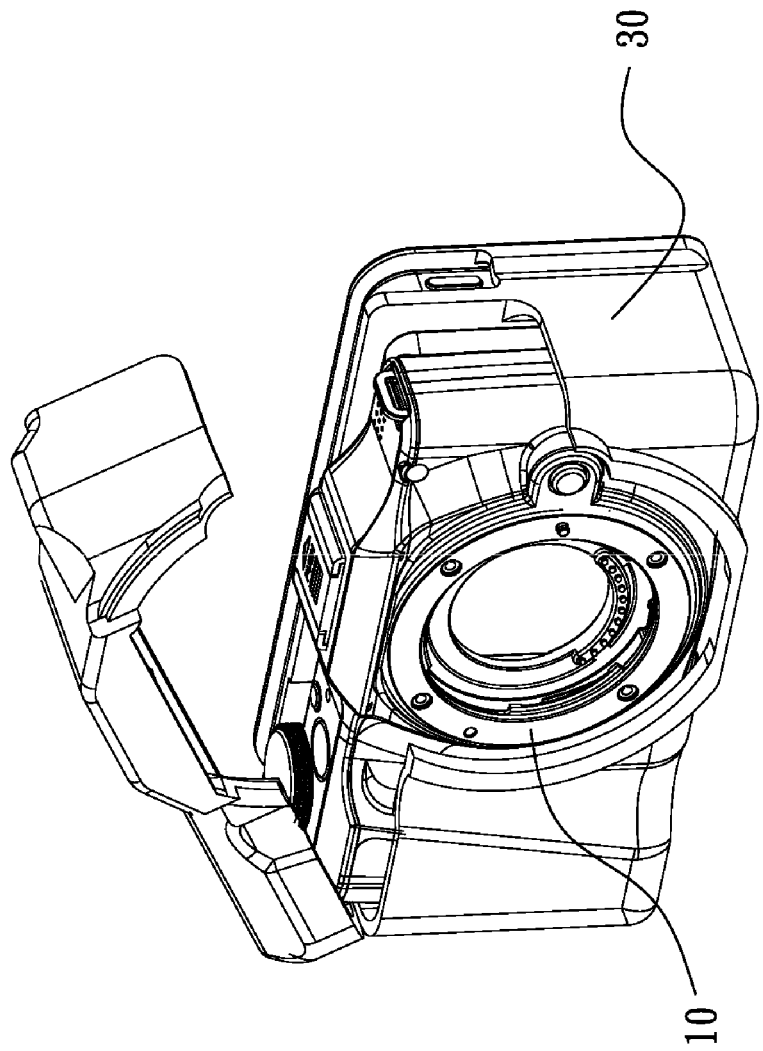
FIG. 1B is a perspective view of the combination apparatus observed in the direction of 'A' of FIG. 1A.

Referring to FIGS. 1A and 1B, FIG. 1A is a perspective view of a first embodiment of a combination apparatus of the invention, and FIG. 1B is a perspective view of the combination apparatus observed in the direction of 'A' of FIG. 1A, wherein the combination apparatus includes a first device (e.g., a camera) 10, a second device (e.g., a mobile phone) 20 and a connecting mechanism 30. In this embodiment, the connecting mechanism 30 is a receiving cover capable of receiving the first device 10 and the second device 20 simultaneously.

Figure 2A:
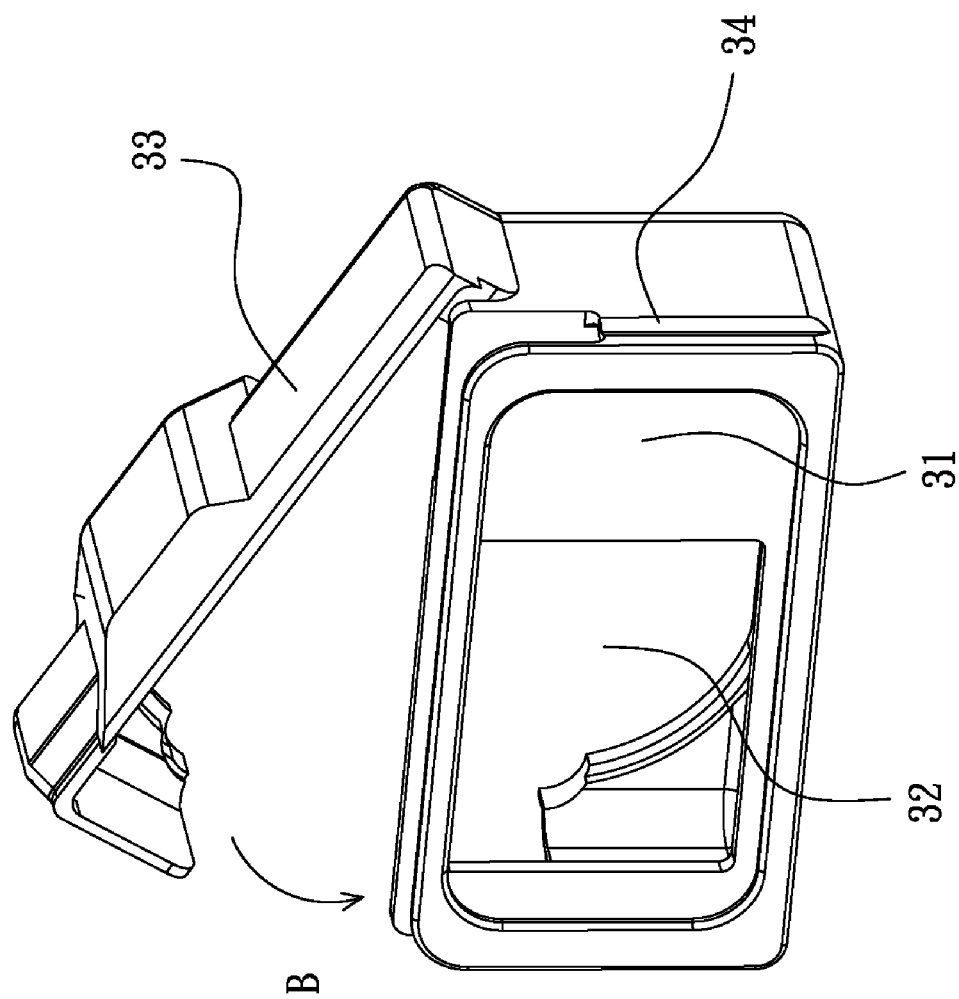
FIG. 2A shows a connection mechanism of the first embodiment of the invention, wherein the connection mechanism includes an upper cover which is opened.
Figure 2B:
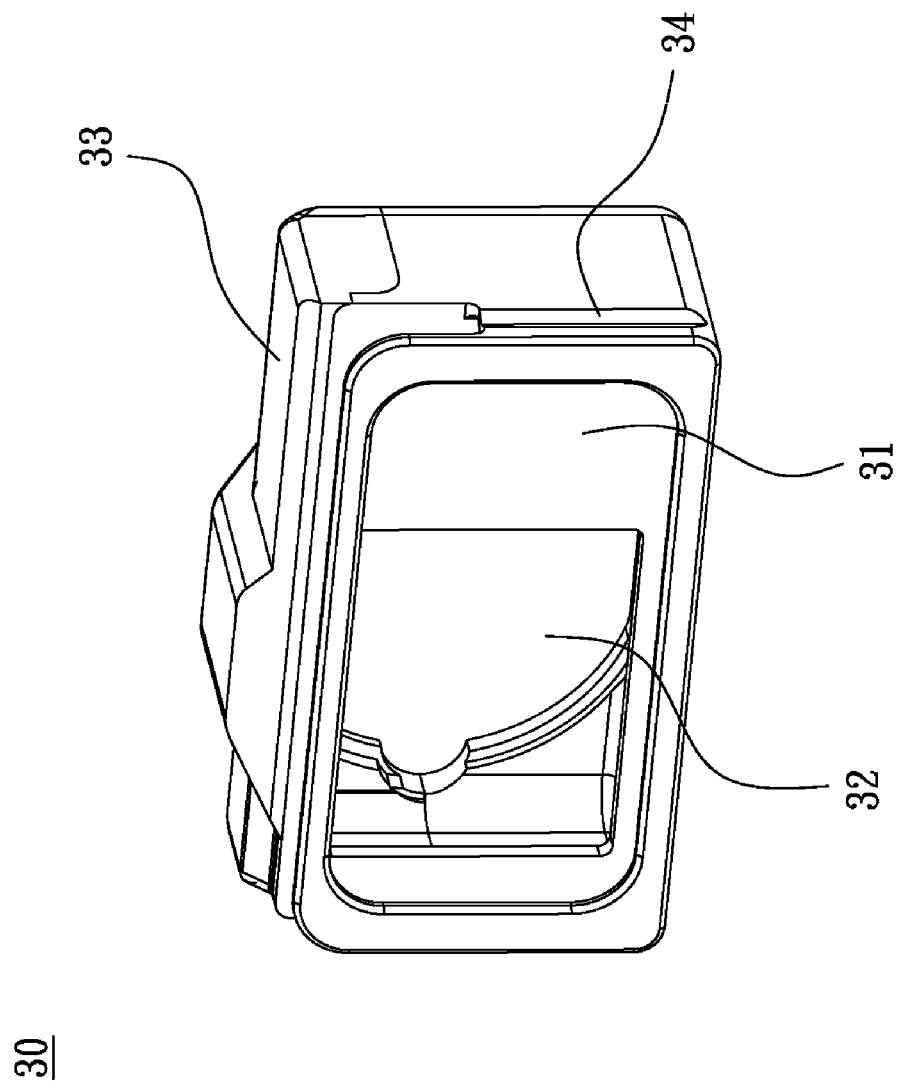
FIG. 2B shows the connection mechanism of the first embodiment of the invention, in which the upper cover of the connection mechanism is closed.

Referring to FIGS. 2A and 2B, FIG. 2A shows the connection mechanism 30 of the first embodiment, and FIG. 2B shows the connection mechanism 30 with an upper cover 33 closed in the direction of 'B' in FIG. 2A. The connection mechanism 30 of this embodiment includes a division plate 31 which is utilized to separate the first device 10 and the second device 20 shown in FIGS. 1A and 1B. The first device 10 includes a first display unit (not marked in Figures), and the second device 20 includes a second display unit (not marked in Figures). For example, the first display unit of the first device 10 is a camera screen, and the second display unit of the second device 20 is a mobile phone screen having a resolution which is generally greater than that of the camera screen. The first device 10 further includes a first image capturing unit (not marked in Figures). For example, the first image capturing unit includes a camera lens and a charge couple device (CCD) (or a complementary metal oxide semiconductor (CMOS) image sensing element). A picture captured by the first image capturing unit of the first device 10 is converted into an image signal and displayed by the first display unit of the first device 10. Therefore, a user can utilize a mobile phone to wirelessly control a camera to photograph by viewing and manipulating a mobile phone screen thereof without switching on the camera screen, thus to save battery power of the camera.

When the first display unit (i.e., the camera screen) is switched on, the user can view the first display unit through an opening 32 of the division plate 31 after the second device 20 is removed. In view of this purpose, the opening 32 of the division plate 31 is directed toward the first display unit of the first device 10, and the opening 32 of the division plate 31 has dimensions which are greater than or equal to those of the first display unit of the first device 10, thereby completely exposing the first display unit of the first device 10 to the user.

As shown in FIGS. 2A and 2B, the division plate 31 is utilized to divide an interior of the connecting mechanism 30 into two spaces for receiving the first device 10 and the second device 20 respectively. The connecting mechanism 30 further includes a corrugated part 34 correspondingly configured on a periphery of the second device 20. When the second device 20 is removed, the user can press the connecting mechanism 30 to flat the corrugated part 34 thereof, thus to reduce the volume of the connecting mechanism 30 for attaining the purpose of convenient arrangement and storage.

Figure 3:
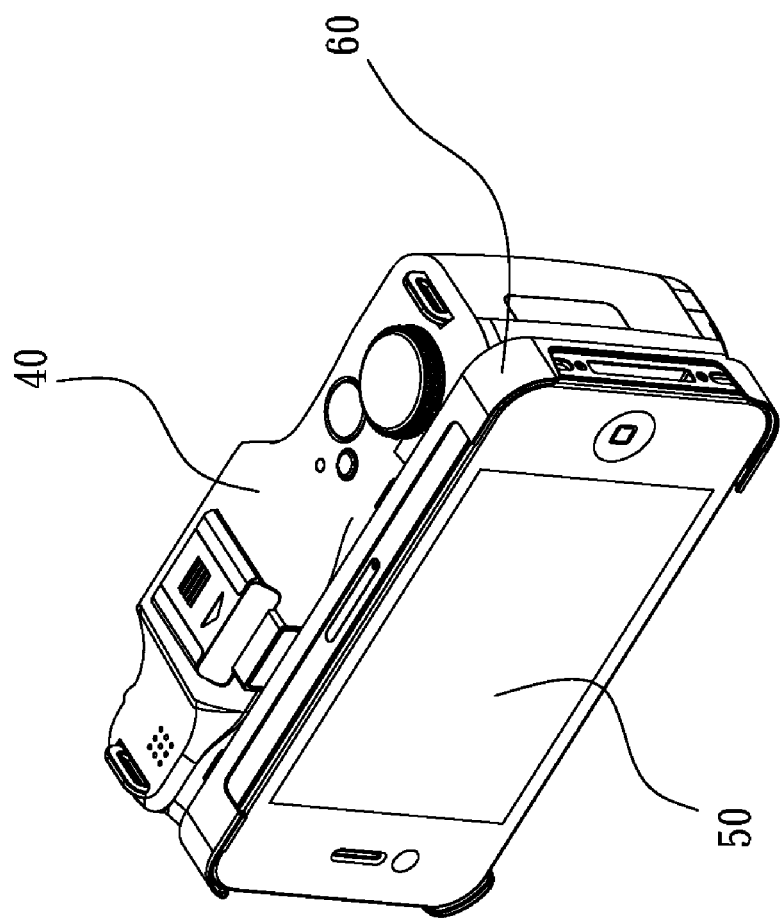
FIG. 3 is a perspective view of a second embodiment of a combination apparatus of the invention.

FIG. 3 is a perspective view of a second embodiment of a combination apparatus of the invention, wherein the combination apparatus includes a first device (e.g., a camera) 40, a second device (e.g., a mobile phone) 50, and a connecting mechanism 60 utilized to detachably fasten the first device 40 and the second device 50.

Figure 4B:
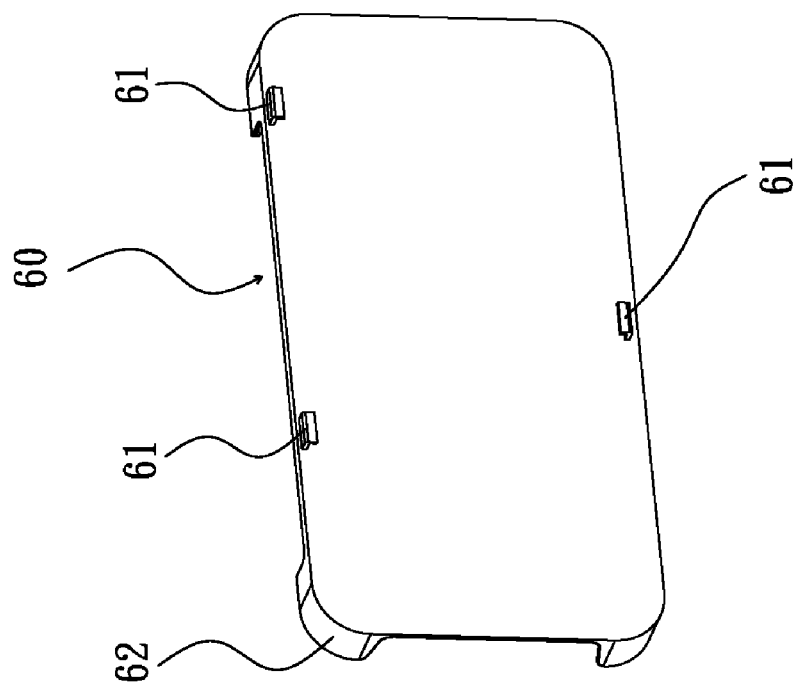
FIG. 4B shows the connection mechanism of the second embodiment of the invention at another observation angle.
Figure 4A:
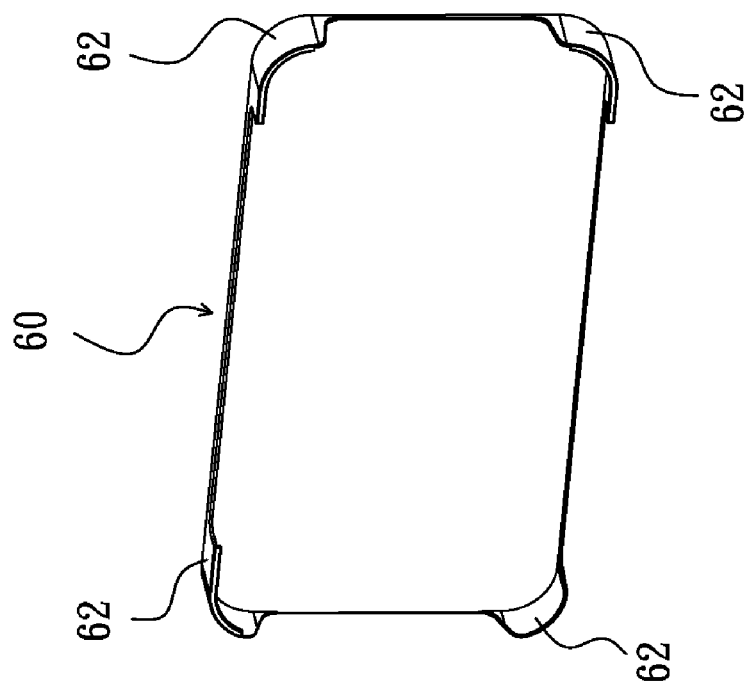
FIG. 4A shows a connection mechanism of the second embodiment of the invention.

FIGS. 4A and 4B show the connecting mechanism 60 of the second embodiment of the invention at different observation angles, respectively. In this embodiment, the connection mechanism 60 is a fixation frame including a plurality of fastening parts 61 and 62, in which the fastening parts 61 and 62 extended in opposite directions are utilized to fasten the first device 40 and the second device 50 respectively.

The user is allowed to hold the combination apparatus of the invention with one hand for viewing the second display unit (the mobile phone screen), and take pictures by using the second device (the mobile phone) 50 to wirelessly control the first device (the camera) 40 without switching on the first display unit (the camera screen), thus to save battery power of the camera.

Figure 5:
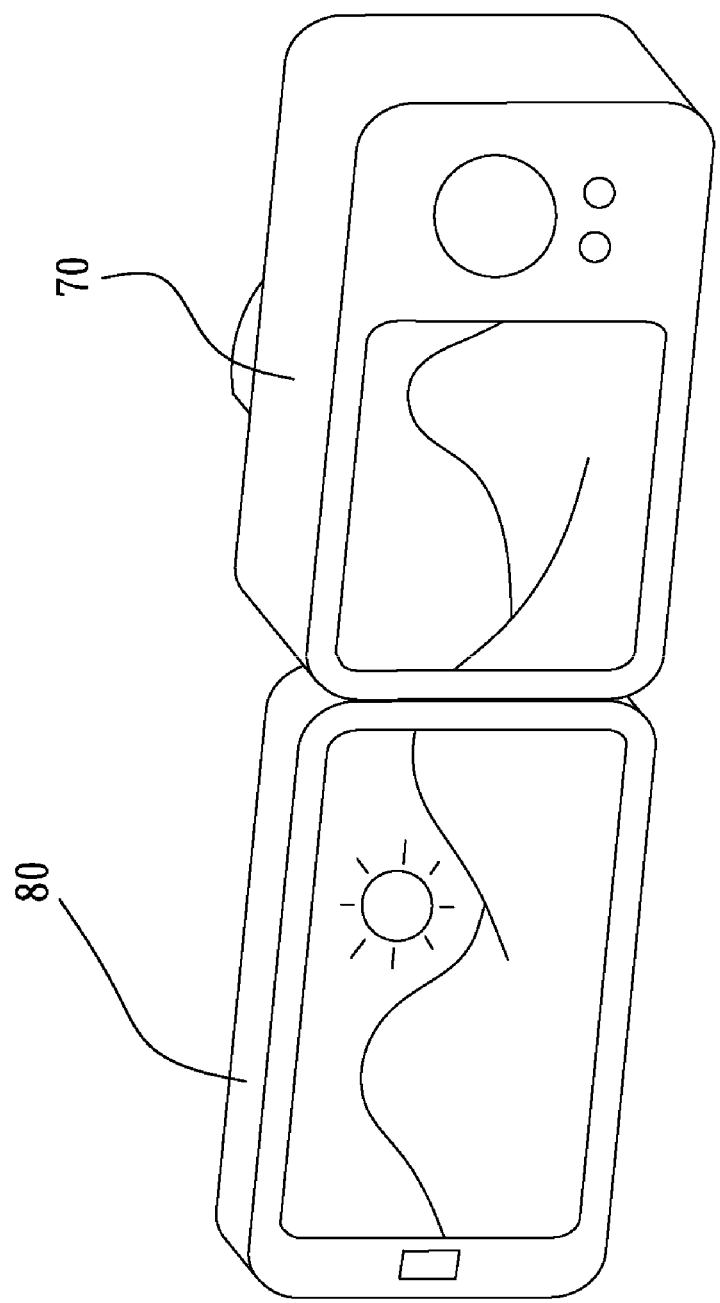
FIG. 5 is a perspective view of a third embodiment of a combination apparatus of the invention.

FIG. 5 is a perspective view of a third embodiment of a combination apparatus of the invention, wherein the combination apparatus includes a first device (e.g., a camera) 70, a second device (e.g., a mobile phone) 80, and a connecting mechanism (not shown in Figures) utilized to fasten the first device 70 and the second device 80 simultaneously. In operation, the first device 70 and/or the second device 80 are/is utilized to capture the picture, and the first display unit (i.e., the camera screen) of the first device 70 and the second display unit (i.e., the mobile phone screen) of the second device 80 are utilized to commonly display the picture for obtaining observation convenience.

In conclusion, the invention utilizes the connecting mechanism to connect the first device (e.g., a camera) and the second device (e.g., a mobile phone), so that the user is allowed to conveniently hold the first device and the second device with one hand for operations. However, it is understood that the connecting mechanism is not limited to the receiving cover and the fixation frame in the above-mentioned embodiments, and the connecting mechanism can be a magnet or a fixation clamp which can also attain the above-described functions. Note that the connecting mechanism can be an independent device or a component appended to the first device or the second device. In addition, it is understood that the amount of the first device or the second device is not limited to one, and configurations formed by one or more first device and one or more second device are included within the scope of the invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A combination apparatus, comprising:
a first device comprising a first display unit and a first image capturing unit, wherein a picture is captured by the first image capturing unit and converted into an image signal for the first display unit to display;
a second device comprising a second display unit with resolution different from that of the first display unit of the first device and being capable of wirelessly controlling the first device; and
a connecting mechanism configured to detachably fasten the first device and the second device, wherein the connecting mechanism is a receiving cover configured to receive the first device and the second device, and the receiving cover comprises a division plate configured to separate the first device from the second device.

2. The combination apparatus as claimed in claim 1, wherein the connecting mechanism is a receiving cover, a fixation frame, a magnet or a fixation clamp.

3. The combination apparatus as claimed in claim 1, wherein the division plate of the receiving cover is provided with an opening which faces the first display unit of the first device.

4. The combination apparatus as claimed in claim 3, wherein the opening of the division plate of the receiving cover has a dimension which is greater than or equal to that of the first display unit of the first device.

5. The combination apparatus as claimed in claim 1, wherein the receiving cover further comprises a corrugated part configured on a periphery of the second device, and the corrugated part of the receiving cover is flatted to reduce a volume of the receiving cover when the second device is removed and the receiving cover is pressed.

6. The combination apparatus as claimed in claim 1, wherein the first device is a camera, and the second device is a mobile phone.

7. The combination apparatus as claimed in claim 1, wherein resolution of the first display unit of the first device is less than that of the second display unit of the second device.

8. A combination apparatus, comprising:
- a first device comprising a first display unit and a first image capturing unit, wherein a picture is captured by the first image capturing unit and converted into an image signal for the first display unit to display;
- a second device comprising a second display unit with resolution different from that of the first display unit of the first device and being capable of wirelessly controlling the first device; and
- a connecting mechanism configured to detachably fasten the first device and the second device, wherein the connecting mechanism is a fixation frame comprising a plurality of first fastening parts and a second fastening parts which are configured to fasten the first device and the second device respectively, and each of the first fastening parts has a tab with a hook portion to engage the first device, and each of the second fastening parts has a L-shaped wall to hold the second device.

9. The combination apparatus as claimed in claim 8, wherein the fastening parts are extended in opposite directions.

* * * * *